(12) United States Patent
Soldano (10) Patent No.: US 7,768,808 B2
(45) Date of Patent: *Aug. 3, 2010

(54) INTEGRATED SYNCHRONOUS RECTIFIER PACKAGE

(75) Inventor: Marco Soldano, El Segundo, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/138,786

(22) Filed: Jun. 13, 2008

(65) Prior Publication Data

US 2008/0247209 A1  Oct. 9, 2008

Related U.S. Application Data

(63) Continuation of application No. 10/978,719, filed on Nov. 1, 2004, now Pat. No. 7,408,796.

(60) Provisional application No. 60/517,333, filed on Nov. 4, 2003.

(51) Int. Cl.
*H02M 7/217* (2006.01)
*H02H 7/125* (2006.01)

(52) U.S. Cl. .................................. 363/127; 363/53

(58) Field of Classification Search .............. 363/21.06, 363/21.14, 89, 125, 126, 127, 52, 53
See application file for complete search history.

(56) References Cited

U.S. PATENT DOCUMENTS

| | | | |
|---|---|---|---|
| 5,173,849 A | 12/1992 | Brooks | 363/127 |
| 5,736,890 A | 4/1998 | Yee et al. | 327/423 |
| 6,038,150 A | 3/2000 | Yee et al. | 363/89 |
| 6,055,170 A | 4/2000 | Yee | 363/89 |
| 6,101,104 A * | 8/2000 | Eng | 363/21.06 |
| 6,271,712 B1 | 8/2001 | Ball | 327/531 |
| 6,456,106 B1 | 9/2002 | Yee | 324/771 |
| 6,535,400 B2 | 3/2003 | Bridge | 363/21.06 |

(Continued)

FOREIGN PATENT DOCUMENTS

EP  0 891 038 A1  1/1999

(Continued)

*Primary Examiner*—Jessica Han
(74) *Attorney, Agent, or Firm*—Farjami & Farjami LLP (57) ABSTRACT

A controller for controlling a controlled switching device functioning as a synchronous rectifier of alternating current, the controller comprising a control circuit for sensing the direction of current through the controlled switching device, the controlled switching device comprising a MOSFET having a conduction channel and a parasitic body diode and having two main current carrying terminals and a control terminal, the control circuit generating a control signal provided to the control terminal to turn on the controlled switching device approximately when current begins to flow in a first direction through the controlled switching device and turn off the controlled switching device approximately when current begins to flow in a second opposite direction through the controlled switching device, further wherein the control circuit for sensing the direction of current through the controlled switching device main current carrying terminals comprises a sensing circuit coupled across the controlled switching device for comparing a voltage across the controlled switching device to first and second thresholds, the sensing circuit causing the control signal to be generated to turn off the controlled switching device at the first threshold and to turn on the controlled switching device at the second threshold.

21 Claims, 6 Drawing Sheets

U.S. PATENT DOCUMENTS

| | | | |
|---|---|---|---|
| 7,408,796 B2 * | 8/2008 | Soldano | 363/127 |
| 2001/0038546 A1 | 11/2001 | Abdoulin | 363/127 |
| 2003/0067795 A1 | 4/2003 | Dubhashi | 363/127 |

FOREIGN PATENT DOCUMENTS

| | | |
|---|---|---|
| EP | 1 067 667 A1 | 1/2001 |
| JP | 2003-224979 | 8/2003 |
| JP | 2003-309978 | 10/2003 |
| JP | 2004-519991 | 7/2004 |
| WO | WO 02/084873 A1 | 10/2002 |

* cited by examiner

Fig. 8 – DCM (Discontinuous Current Mode) operation

Fig. 9 – CCM (Continuous Current Mode) operation

INTEGRATED SYNCHRONOUS RECTIFIER PACKAGE

CROSS REFERENCE TO RELATED APPLICATIONS

This is a continuation of U.S. patent application Ser. No. 10/978,719, filed Nov. 1, 2004 entitled INTEGRATED SYNCHRONOUS RECTIFIER PACKAGE, which application claims the benefit and priority of U.S. Provisional Application Ser. No. 60/517,333 entitled "INTEGRATED SMART RECTIFIER" filed Nov. 4, 2003, the entire disclosure of which is incorporated herein by reference.

BACKGROUND OF THE INVENTION

The present invention relates to electrical rectification circuits, and in particular, to synchronous rectifiers which are controlled rectification devices. More particularly, the present invention relates to an integrated synchronous rectifier which can be substituted for a non-synchronous rectifier in a rectification circuit with minimal circuit change.

Output rectification in off-line isolated power supplies is often implemented by use of Schottky or PIN diodes. The typical disadvantage is that every diode has a nominal threshold voltage and therefore high conduction losses. Synchronous rectification has been introduced for flyback converters and in other applications where a MOSFET or other controlled switch is driven by an appropriate drive circuit to emulate the operation of a diode. The disadvantage of the MOSFET synchronous rectifier is the added complexity in the design of the rectification stage, which in the case of normal diode rectification, is very simple, consisting of only a diode. In particular, to substitute a synchronous rectifier for a diode requires the addition of the drive circuitry for the synchronous rectification device, leading to increased complexity and a larger number of circuit components.

Applicant is aware of the following prior art:

U.S. Pat. No. 6,353,544 uses a current transformer to sense current, making it impracticable for an integrated solution. U.S. Pat. No. 6,442,048 is another prior art example, which cannot be used to provide a one package integrated solution with a minimal external terminal count.

SUMMARY OF THE INVENTION

It is an object of the present invention to provide a synchronous rectifier which can be simply substituted for the normal non-synchronous rectification diode. Diodes have two terminals, a cathode and anode. It is an object of the invention to provide a synchronous rectifier which can be substituted for the two terminal diode device and which has a minimum number of terminals, the minimum being an anode, cathode and a power connection. In the case where the ground connection is common with the anode or cathode, the device according to the invention can have a minimum of three terminals, anode, cathode and power supply terminal.

It is accordingly an object of the present invention to integrate control circuitry and an active switch in a single package with a minimal number of pins in order to obtain a so-called "smart" rectifier.

The objects of the invention are achieved by an integrated synchronous rectifier package comprising: a controlled switching device having two main current carrying terminals and a control terminal, a control circuit for sensing the direction of current through the controlled switching device main current carrying terminals and for generating a control signal provided to the control terminal to turn on the controlled switching device when current flows in a first direction through the controlled switching device and to turn off the controlled switching device when current flows in a second opposite direction through the controlled switching device, the control circuit and controlled switching device being contained within a single package having no more than four external electrical connections.

The objects of the invention are also achieved by a synchronous rectifier package comprising a controlled switching device having two main current carrying terminals and a control terminal, a control circuit for sensing the direction of current through the controlled switching device main current carrying terminals and for generating a control signal provided to the control terminal to turn on the controlled switching device approximately when current begins to flow in a first direction through the controlled switching device and to turn off the controlled switching device approximately when current begins to flow in a second opposite direction through the controlled switching device, and the control circuit and controlled switching device being contained within a single package having no more than four external electrical connections.

The objects of the invention are also achieved by an integrated circuit package comprising, a substrate, a MOSFET and its intrinsic body diode (or a separate parallel diode) disposed on the substrate and having source and drain terminals connected to external lead terminals, a control integrated circuit disposed on the MOSFET for controlling the MOSFET and having power connections coupled to the external lead terminals and a control terminal of the MOSFET for controlling the conduction state of the MOSFET, and the MOSFET and the control integrated circuit being housed in a common package and the external lead terminals bringing the source and drain terminals and the power connections of the integrated circuit externally of the package.

The present invention is not only limited to the case where two discrete dice are co-packaged. A monolithic solution is also possible where the controller and the power MOS are both on the same substrate. The tradeoffs of the 'hybrid' vs. 'monolithic' solutions need to be compared, but they both represent an optimal embodiments of the invention.

Other features and advantages of the present invention will become apparent from the following description of the invention which refers to the accompanying drawings.

BRIEF DESCRIPTION OF THE DRAWING(S)

The invention will now be described in greater detail in the following detailed description with reference to the drawings in which.

Other objects, features and advantages of the present invention will be apparent from the detailed description which follows.

DETAILED DESCRIPTION OF THE INVENTION

Figure 1:
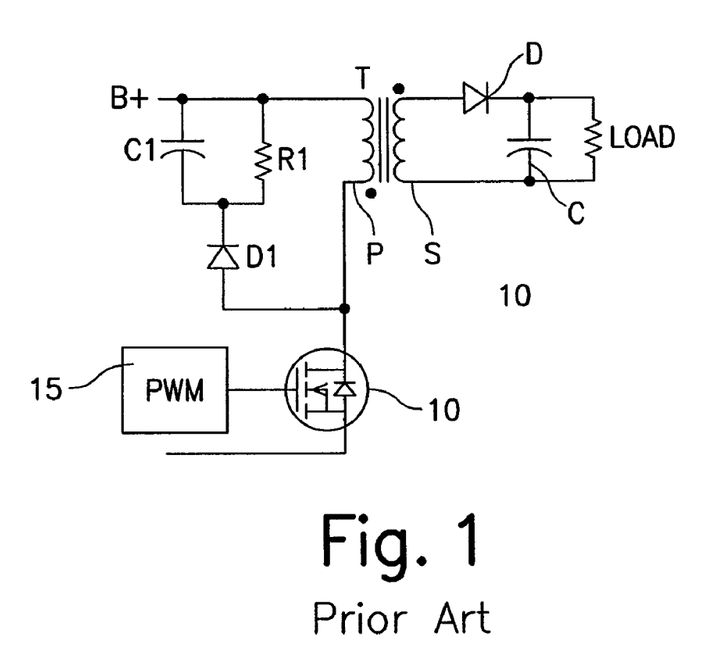
FIG. 1 shows a typical prior art diode rectification circuit in a flyback converter circuit.

With reference now to the drawings, FIG. 1 shows a typical prior art flyback converter circuit with a diode rectification stage in the secondary of the flyback transformer. The circuit includes an FET 10 driven by a pulse width modulation stage 15. The FET 10 switches current through a primary P of a flyback transformer T. The secondary s output is rectified by a diode D and the output voltage is provided to an output storage capacitor C and to the load. The primary of the transformer P is coupled to a voltage source B+. A circuit comprising a diode D1 capacitor C1 and resistor R1 is provided to dampen oscillations.

Figure 2:
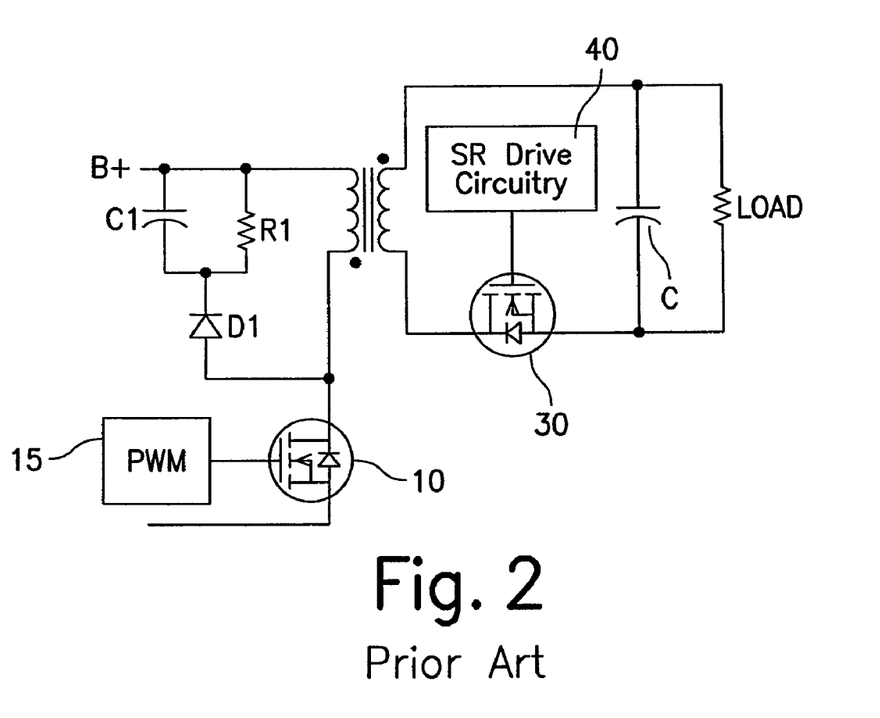
FIG. 2 shows a typical prior art flyback converter circuit employing synchronous rectification.

FIG. 2 shows the circuit of FIG. 1 employing a synchronous rectification stage comprising an FET 30 including an active rectifier switch controlled by a synchronous rectifier (SR) drive circuit 40.

Typical drawbacks of the circuit of FIG. 1 are that the diode D has a voltage drop on the order of 0.7 volts and therefore high conduction losses. The drawback of the circuit of FIG. 2 is that it is much more complex than the simple circuit of FIG. 1 requiring SR drive circuitry 40 to drive the synchronous rectifier, thus requiring many more components and connections.

According to the invention, it is desired to provide a smart rectifier which comprises a synchronous rectifier but with a minimum number of pins and thus, without additional complexity, can be substituted for the diode rectifier of FIG. 1. It is anticipated that the minimum number of pins required would be three, that is, the anode and cathode connections normally required by the diode and in addition, a power supply pin to provide power. It is also within the scope of the invention to provide a four terminal device also including a ground connection where it is necessary to isolate the ground connection from the cathode or anode diode connections.

In order to emulate the diode rectification function, it is necessary to determine the direction of flow of the current through the rectifier. When the sign of the current is reversed, the control should turn off the active switch promptly. In order to perform this function, the control needs to sense the current in the active switch. For this purpose, the on-resistance of the active switch can be used to generate a voltage proportional to the switch current.

Figure 3:
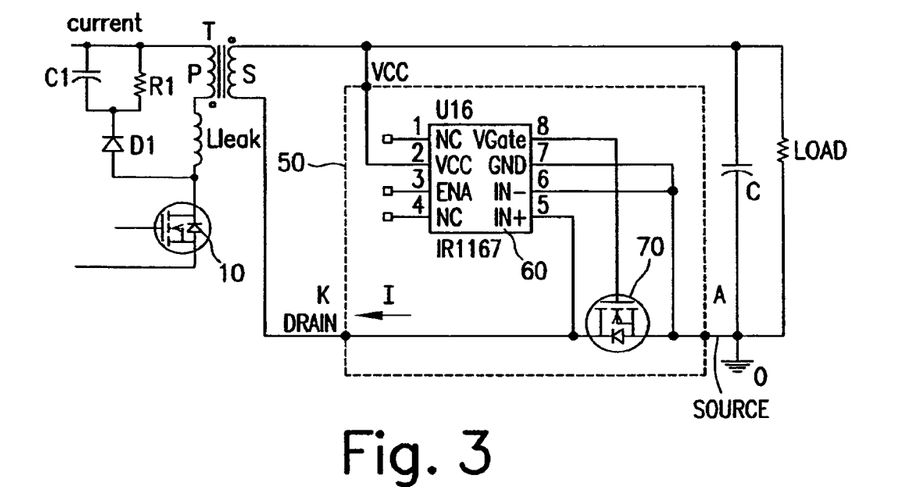
FIG. 3 shows a circuit according to the invention for implementing an integrated synchronous rectifier in a flyback converter circuit.

FIG. 3 shows an implementation of a synchronous rectifier package 50 having three connections, drain, source and power VCC. In the circuit of FIG. 3, the integrated synchronous rectifier is designated as 50. It includes a control circuit 60 and an active switch 70 comprising, for example, a MOSFET. The control circuit 60 requires a common or ground connector which is connected to the source of the switch 70 and a power supply pin VCC. The other pin is the drain of the active switch 70. In the circuit of FIG. 3, the drain functions as the cathode and the source as the anode of the simple diode rectifier. The device 50 only requires three external electrical connections as the ground connection is common with the source. It accordingly can be easily substituted for a two terminal diode. Only one additional connection, power VCC, is necessary, and this is easily accommodated as the power source VCC is present in the circuit anyway, as shown.

Figure 3A:
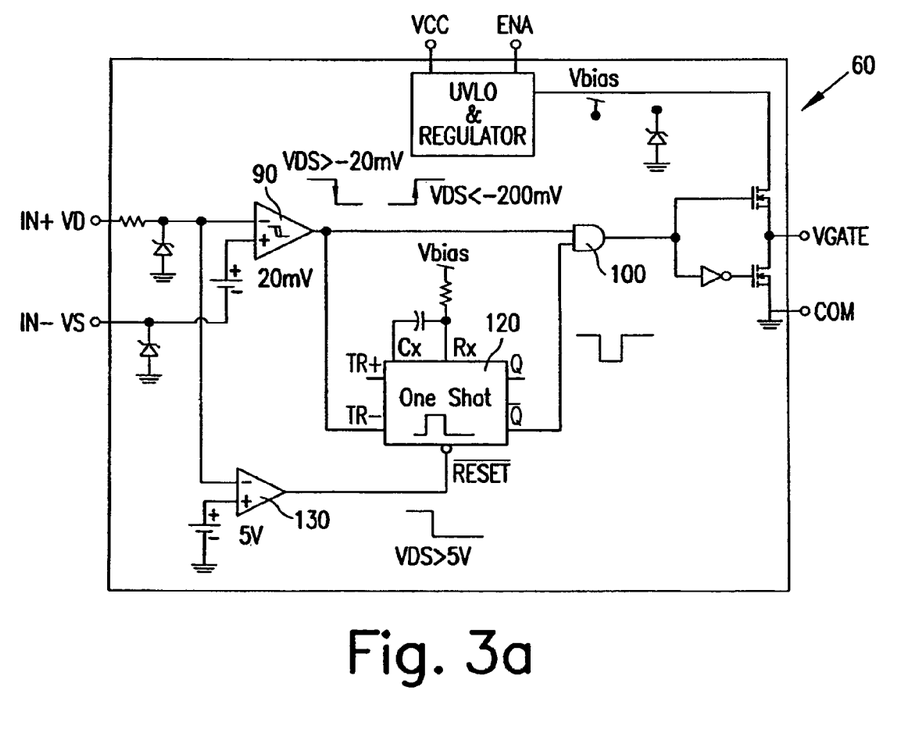
FIG. 3A shows the block diagram of the control circuitry for the active rectifier switch of FIG. 3.

FIG. 3A shows details of the control circuit 60. The drain of the active switch 70 is coupled to the input VD. The source is connected to the input VS. The drain-source voltage is monitored by a Schmidt trigger circuit 90. When the drain-source voltage is negative, corresponding to current flowing in the direction I of FIG. 3, the body diode of switch 70 will start conducting the current I developing a voltage drop across the terminals D and S. When $V_{TH2}$ is selected to be smaller in absolute value than the conduction threshold of the body diode $V_F$, as soon as the body diode starts conducting, the trigger circuit 90 turns on, providing a high level to the AND gate 100. At the same time, the one shot 120, which is negative edge triggered, remains in a state whereby its Q not output is high, thereby enabling AND gate 100 and providing a supply voltage Vgate to turn on the MOSFET 70. This corresponds to conduction of the switch 70 during the positive AC half cycle.

During the negative AC half cycle, current will attempt to flow in the direction opposite the current I shown in FIG. 3. However, the circuit 60 of FIG. 3A will turn off the switch 70 just before the current begins to flow in the opposite direction during the negative half cycle. Once the voltage VDS reaches $V_{TH1}$ near the beginning of the negative half cycle, the trigger circuit 90 will go low, providing a low input to the AND gate 100 and turning off the gate drive Vgate. At the same time, the one shot 120 will generate a negative going pulse to the gate 100. This negative pulse will blank the Schmidt trigger circuit 90 for a programmed amount of time $T_{BLANK}$. The reason for blanking the comparator 90 is to avoid further false triggering. In fact, as soon as the gate is turned off, single $V_{TH1}$ is negative, there will still be some amount of current flowing through the body diode.

Figure 8:
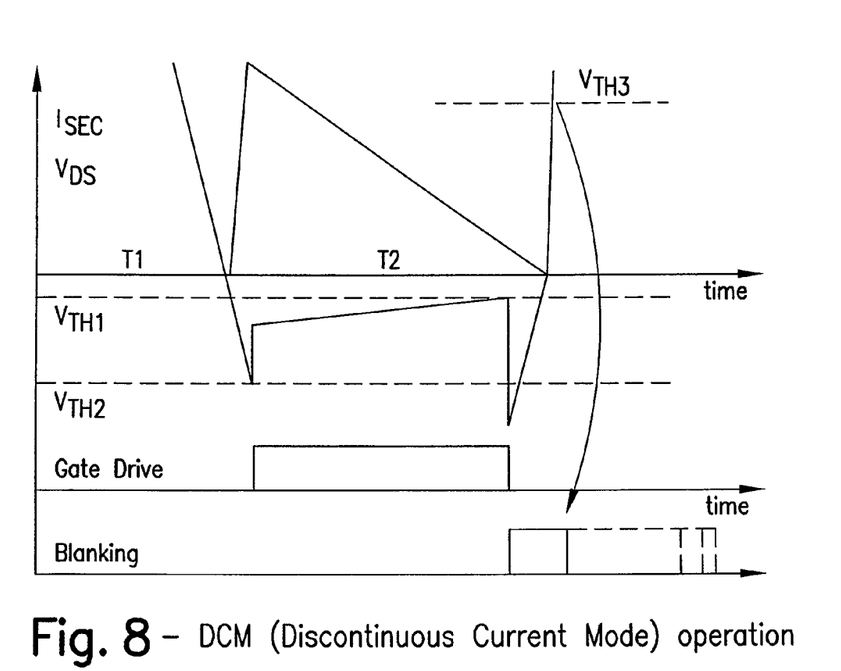
FIGS. 8 and 9 show operation of the invention in two modes of operation.

That current, once the MOSFET 70 is off, would build a voltage in excess of $V_{TH2}$ and therefore try to turn the gate of 70 back on, as can be seen in FIG. 8, possibly causing high frequency resonance.

The one shot monostable 120 is in place to avoid this condition.

The selection of the pulse duration $T_{BLANK}$ is important. On one hand it must be selected long enough to avoid spurious triggering, on the other, if too long, it will limit the maximum operating switching frequency for this circuit.

Therefore a third threshold is used. $V_{TH3}$ is positive and large enough to determine when the positive half cycle is completed and the negative cycle is started. Once $V_{TH3}$ is exceeded the one shot is immediately reset, without waiting for the pulse $T_{BLANK}$ to end. This action will restore the circuit in its initial condition and prepare it for the next active cycle.

In an exemplary embodiment, $V_{TH1}$ is −20 MV, $V_{TH2}$ is −200 mv and $V_{TH3}$ is 5V.

Figure 3B:
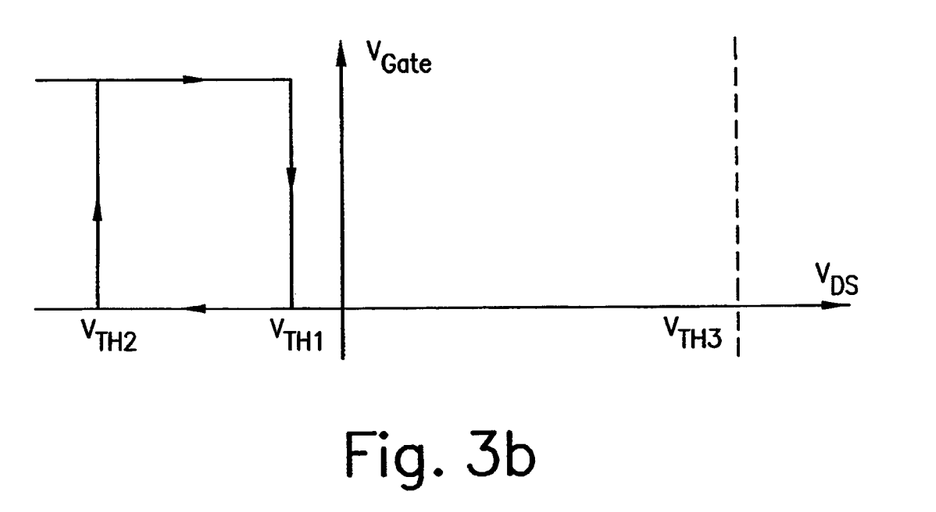
FIG. 3B shows the transfer function of the circuit of FIG. 3A.

FIG. 3B shows the switching function of the circuit of FIG. 3A. For voltages VDS in excess of $V_{TH1}$, Vgate is off, showing that the active switch 70 is turned off when current would attempt to flow in the direction opposite the current I shown in FIG. 3. When VDS is less than $V_{TH2}$, then current is flowing in direction I and the active switch 70 is turned on as shown by the voltage Vgate in FIG. 3B.

The thresholds $V_{TH1}$ and $V_{TH2}$ need to be chosen so that the voltage drop across the active switch falls between these two thresholds in normal operation, and so that $V_{TH2}$ is lower (in absolute value) than the body diode conduction threshold voltage.

This is generally not a problem since the body diode forward voltage drop is generally one order of magnitude larger than the 'on' voltage across the active switch.

Figure 4:
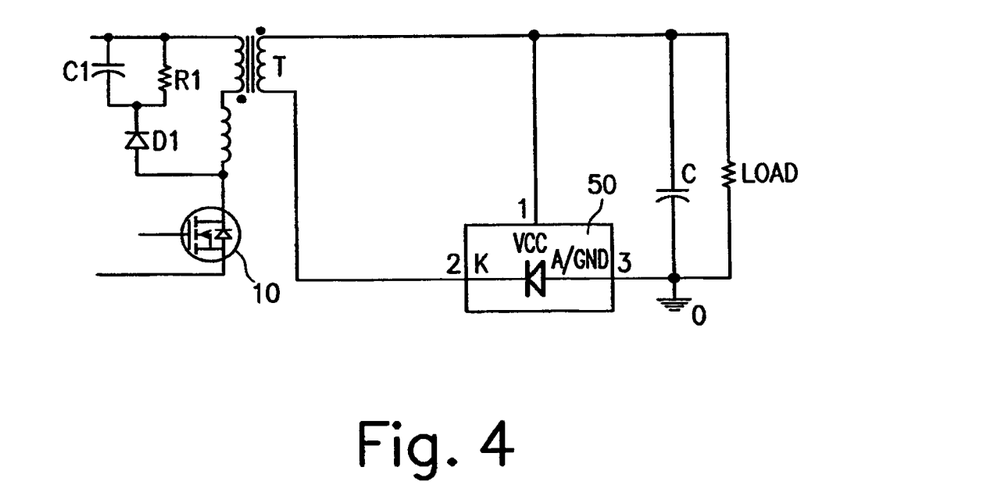
FIG. 4 shows the circuit of FIG. 3 incorporating the integrated smart rectifier into the circuit as a single circuit component.

FIG. 4 shows the circuit of FIG. 3 wherein it is indicated by a single component 50 including three connections, cathode, anode and a power supply connection VCC. The anode also functions as the ground connection for the control circuit which is integrated in the package 50. The control circuit and the active switch are integrated into a single power package with only three pins.

Figure 5:
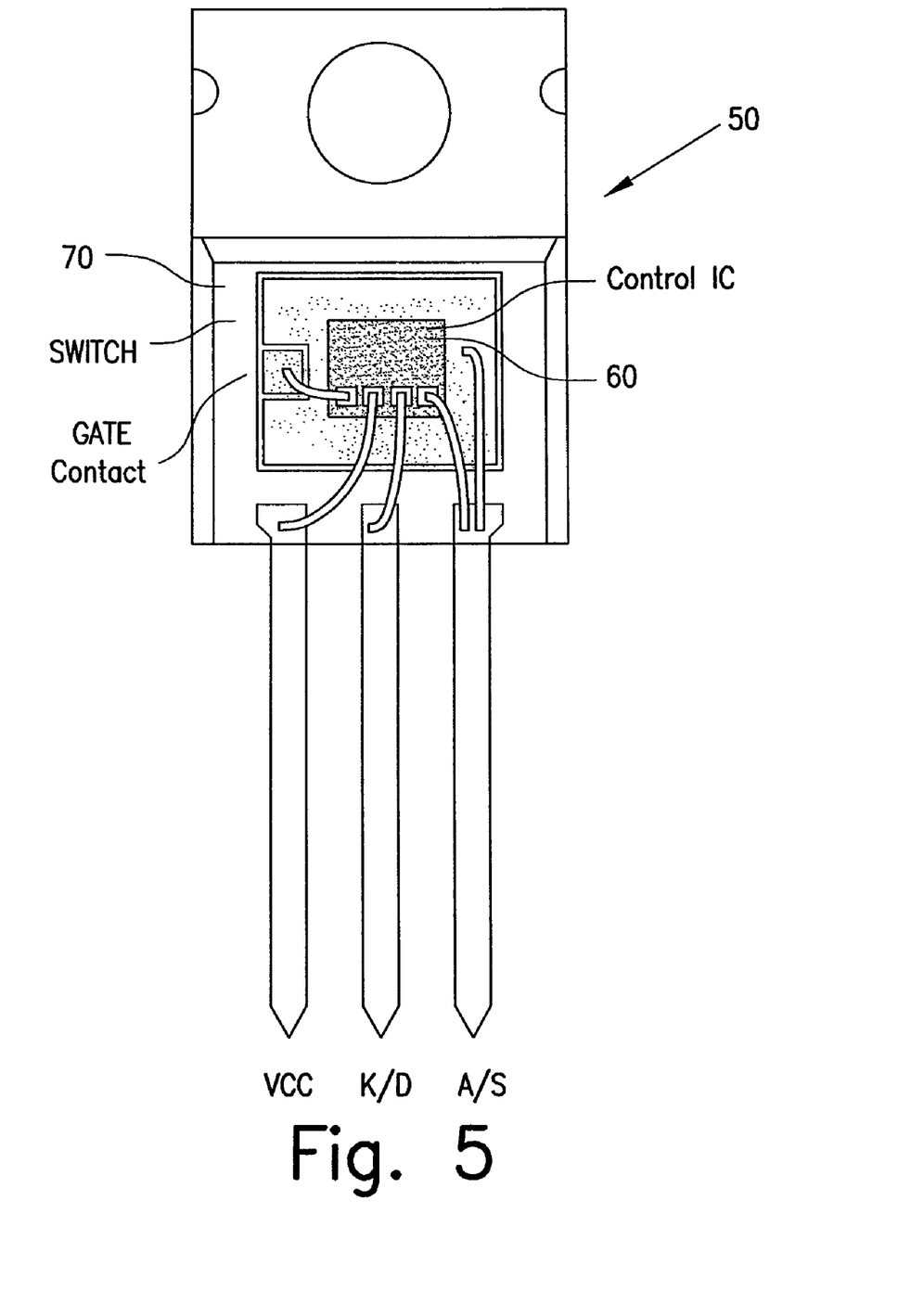
FIG. 5 is a mechanical drawing of the smart rectifier of FIG. 4.

FIG. 5 shows a mechanical drawing of the smart rectifier 50. The smart rectifier includes the switch 70 with its gate contact as shown. The control IC 60 is packaged on top of the switch 70. The control IC and switch are wire bonded to the three terminals A/S, K/D and VCC.

Figure 6:
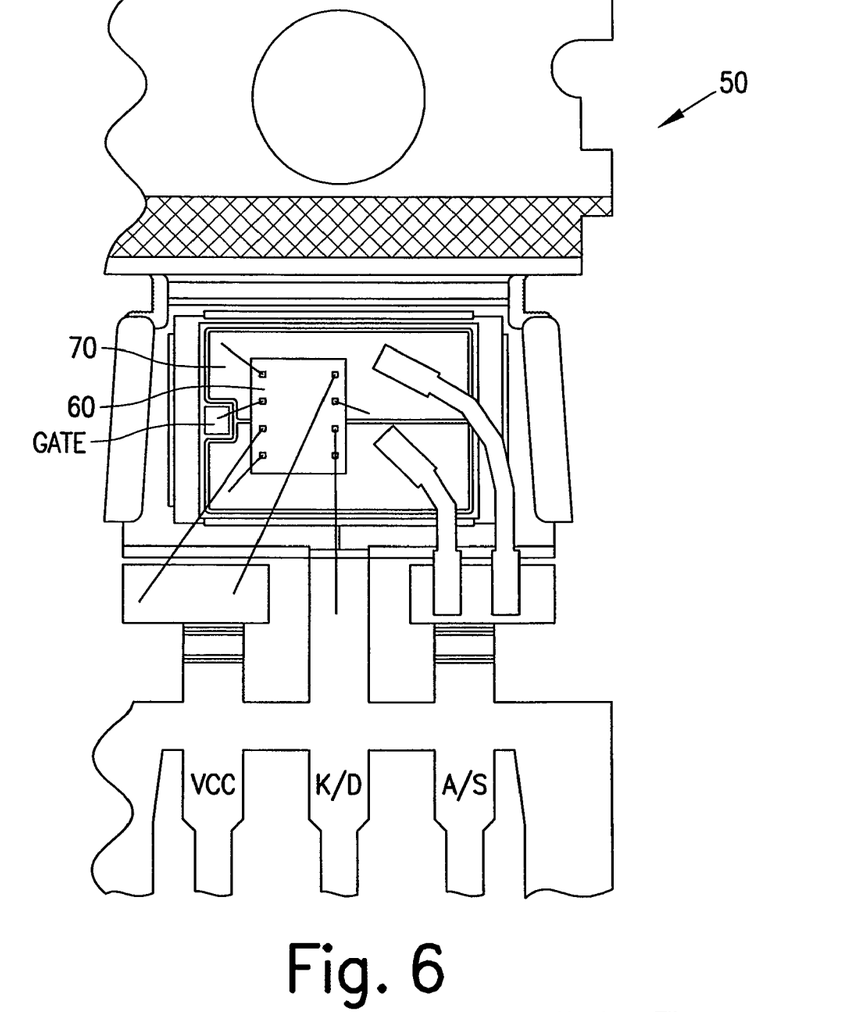
FIG. 6 shows details of another embodiment of the smart rectifier of FIG. 4.

FIG. 6 shows another implementation of the smart diode 50 comprising the switch 70 and the control IC 60.

Figure 7:
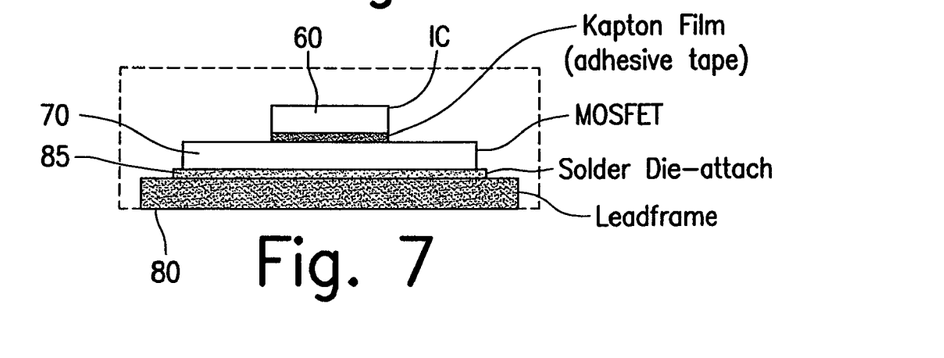
FIG. 7 is a cross-sectional view of the structure of the smart rectifier.

FIG. 7 shows the copacking of the control IC 60 and the switch 70. The control IC 60 is isolated from the switch 70 by a kapton film or adhesive tape. The switch 70 is attached to a lead frame 80 via a soldered die attach 85.

The advantages of the invention are that it allows a quick replacement of diode rectifiers with actively controlled rectifiers, preferably based on MOSFET devices, which in turn dramatically reduces conduction and leakage losses. The resulting smart rectifier will typically have only one additional pin VCC compared to a single diode, resulting in minimal system complexity increase. Smart rectifiers according to the invention can also be placed in parallel since for all purposes they act as diodes and can be used for output synchronous rectification. They can also be used for OR-ing functions.

Figure 9:
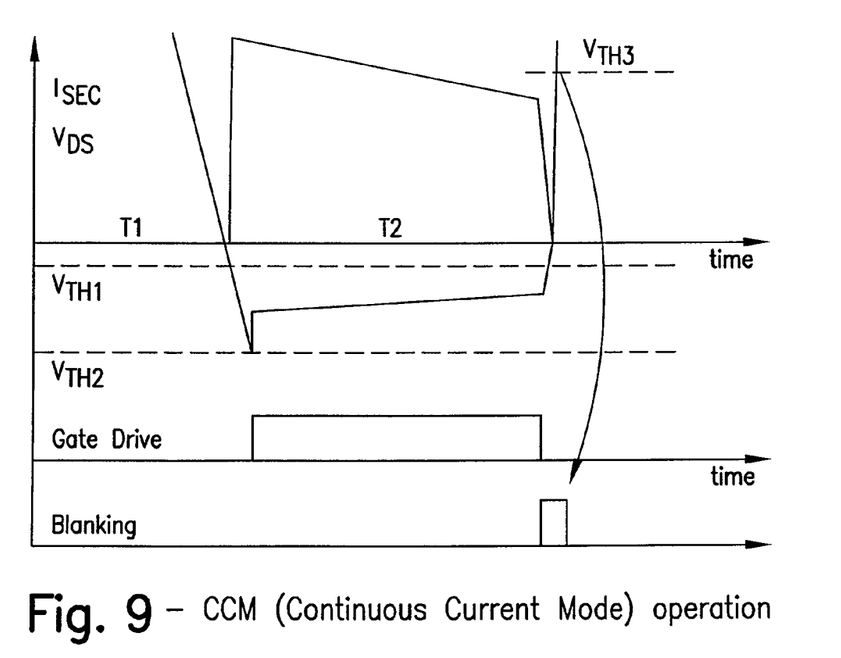

FIGS. 8 and 9 show operation of the circuit in two modes of operation. FIG. 8 shows DCM (discontinuous conduction mode) and FIG. 9 shows CCM (continuous current mode). In these figures, the following definition apply:

$V_{TH1}$: Turn-off threshold—when current decays below a certain level the switch can be turned off, allowing conduction in the body diode.

$V_{TH2}$: Turn-on threshold—as soon as $V_{DS}$ become negative, the body diode will start conducting. These typically have voltage drops much higher than the MOSFET on-state.

$V_{TH3}$: Reset threshold—when the cycle is completed and the $V_{DS}$ voltage will be positive and start to increase again, the internal one shot will be reset. This way the system is ready for next cycle.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. An integrated synchronous rectifier package comprising:
    a controlled switching device having two main current carrying terminals and a control terminal;
    the controlled switching device comprising a MOSFET having a conduction channel and a parasitic body diode;
    a control circuit for sensing the direction of current through the controlled switching device main current carrying terminals and for generating a control signal provided to the control terminal to turn on the controlled switching device approximately when current begins to flow in a first direction through the controlled switching device and to turn off the controlled switching device approximately when current begins to flow in a second opposite direction through the controlled switching device;
    and the control circuit and controlled switching device being contained within a single package having no more than four external electrical connections, further wherein the control circuit for sensing the direction of current through the controlled switching device main current carrying terminals comprises a sensing circuit coupled across the controlled switching device for comparing a voltage across the controlled switching device to first and second thresholds, the sensing circuit causing the control signal to be generated to turn off the controlled switching device at the first threshold and to turn on the controlled switching device at the second threshold.

2. The integrated synchronous rectifier package of claim 1, wherein the conduction channel of the controlled switching device is turned on when current begins to flow through the body diode.

3. The integrated synchronous rectifier package of claim 2, wherein the second threshold has a larger absolute voltage than the first threshold and wherein the first threshold is near a zero crossing of the current through the controlled switching device.

4. The integrated synchronous rectifier package of claim 1, further comprising a circuit for blanking the control signal for a time period to prevent a voltage that develops across the body diode from. causing the control circuit to turn the controlled switching device back after it has been turned off.

5. The integrated synchronous rectifier package of claim 4, wherein the circuit for blanking the control signal is reset when a voltage level across the controlled switching device is detected that exceeds a third threshold such that current flow in the first direction has been completed, corresponding to a first half cycle of alternating current, and a second, opposite half cycle has started.

6. The integrated synchronous rectifier package of claim 1, wherein the package has no more than four external electrical connections comprising power, ground, cathode and anode.

7. The integrated synchronous rectifier package of claim 1, wherein the package has no more than three external electrical connections comprising power, cathode and anode where a ground connection is common with one of the anode or cathode.

8. A controller for controlling a controlled switching device functioning as a synchronous rectifier of alternating current, the controller comprising:
    a control circuit for sensing the direction of current through the controlled switching device, the controlled switching device comprising a MOSFET having a conduction channel and a parasitic body diode and having two main current carrying terminals and a control terminal, the control circuit generating a control signal provided to the control terminal to turn on the controlled switching device approximately when current begins to flow in a first direction through the controlled switching device and turn off the controlled switching device approximately when current begins to flow in a second opposite direction through the controlled switching device, further wherein the control circuit for -sensing the direction of current through the controlled switching device main current carrying terminals comprises a sensing circuit coupled across the controlled switching device for comparing a voltage across the controlled switching device to first and second thresholds, the sensing circuit causing the control signal to be generated to turn off the controlled switching device at the first threshold and to turn on the controlled switching device at the second threshold.

9. The controller of claim 8, wherein the conduction channel of the controlled switching device is turned on when current begins to flow through the body diode.

10. The controller of claim 9, wherein the second threshold has a larger absolute voltage than the first threshold and wherein the first threshold is near a zero crossing of the current through the controlled switching device.

11. The controller of claim 8, further comprising a circuit for blanking the control signal for a time period to prevent a voltage that develops across the body diode when the controlled switching device is turned off from causing the control circuit to turn the controlled switching device back on after it has been turned off.

12. The controller of claim 11, wherein the circuit for blanking the control signal is reset when a voltage level across the controlled switching device is detected that exceeds a third threshold such that current flow in the first direction has been completed, corresponding to a first half cycle of alternating current, and a second, opposite half cycle has started.

13. The controller of claim 12, wherein the circuit for blanking the control signal is reset when a voltage level across the controlled switching device is detected corresponding to the third threshold level without waiting for the time period of the blanking circuit to end.

14. The controller of claim 13, wherein when the blanking circuit is reset, the control circuit controls the controlled switching device for a following half cycle of the alternating current.

15. An integrated synchronous rectifier package comprising:
   a controlled switching device having at least one main current carrying terminal and a control terminal;
   the controlled switching device comprising a MOSFET having a conduction channel and a parasitic body diode;
   a control circuit for sensing the direction of current through the controlled switching device said at least one main current carrying terminal and for generating a control signal provided to the control terminal to turn on the controlled switching device approximately when current begins to flow in a first direction through the controlled switching device and to turn off the controlled switching device approximately when current begins to flow in a second opposite direction through the controlled switching device;
   and the control circuit and controlled switching device being contained within a single package.

16. The integrated synchronous rectifier package of claim 15 wherein said single package has no more than four external electrical connections, further wherein the control circuit for sensing the direction of current through the controlled switching device main current carrying terminals comprises a sensing circuit coupled across the controlled switching device for comparing a voltage across the controlled switching device to first and second thresholds, the sensing circuit causing the control signal to he generated to turn off the controlled switching device at the first threshold and to turn on the controlled switching device at the second threshold.

17. The integrated synchronous rectifier package of claim 16, wherein the conduction channel of the controlled switching device is turned on when current begins to flow through the body diode.

18. The integrated synchronous rectifier package of claim 16, wherein the second threshold has a larger absolute voltage than the first threshold and wherein the first threshold is near a zero crossing of the current through the controlled switching device.

19. The integrated synchronous rectifier package of claim 16, further comprising a circuit for blanking the control signal for a time period to prevent a voltage that develops across the body diode from causing the control circuit to turn the controlled switching device back on after it has been turned off.

20. The integrated synchronous rectifier package of claim 16, wherein the package has no more than four external electrical connections comprising power, ground, cathode and anode.

21. The integrated synchronous rectifier package of claim 16, wherein the package has no more than three external electrical connections comprising power, cathode and anode where a ground connection is common with one of the anode or cathode.

* * * * *

UNITED STATES PATENT AND TRADEMARK OFFICE
CERTIFICATE OF CORRECTION

| | |
|---|---|
| PATENT NO. | : 7,768,808 B2 |
| APPLICATION NO. | : 12/138786 |
| DATED | : August 3, 2010 |
| INVENTOR(S) | : Marco Soldano |

It is certified that error appears in the above-identified patent and that said Letters Patent is hereby corrected as shown below:

In the claims, column 6, line 25, "from." should be changed to --from--.

In the claims, column 6, line 26, --on-- should be inserted immediately before "after".

In the claims, column 6, line 58, "-sensing" should be changed to --sensing--.

In the claims, column 7, line 31, "main." should be changed to --main--.

Signed and Sealed this
Twenty-ninth Day of November, 2011

David J. Kappos
*Director of the United States Patent and Trademark Office*